United States Patent

Schraeder

[15] 3,672,216
[45] June 27, 1972

[54] MEASUREMENT OF TEMPERATURE OF A MOVING STRAND IN A VACUUM

[72] Inventor: Albin E. Schraeder, Pittsburgh, Pa.
[73] Assignee: Jones & Laughlin Steel Corporation, Pittsburgh, Pa.
[22] Filed: April 2, 1970
[21] Appl. No.: 25,242

Related U.S. Application Data

[63] Continuation-in-part of Ser. No. 585,140, Oct. 7, 1966, abandoned.

[52] U.S. Cl. .............................73/343 R, 73/362.8, 136/221
[51] Int. Cl. ...........................................................G01k 1/16
[58] Field of Search..................73/343, 351, 349, 359, 362.8; 136/221, 223, 230

[56] References Cited

UNITED STATES PATENTS

| | | | |
|---|---|---|---|
| 2,627,182 | 2/1953 | Quereau | 73/351 |
| 2,694,313 | 11/1954 | Nieman | 73/359 |
| 3,099,160 | 7/1963 | Werner | 73/342 |

FOREIGN PATENTS OR APPLICATIONS

| | | | |
|---|---|---|---|
| 815,856 | 8/1951 | Germany | 73/351 |

*Primary Examiner*—Louis R. Prince
*Assistant Examiner*—Denis E. Corr
*Attorney*—T. A. Zalenski and G. R. Harris

[57] ABSTRACT

The temperature of a moving strand in a vacuum is measured by placing a thermocouple in sliding contact with the strand while supplying a gas inert to the strand to the thermocouple in the region of its contact with the strand.

6 Claims, 2 Drawing Figures

PATENTED JUN 27 1972   3,672,216

INVENTOR.
ALBIN E. SCHRAEDER
BY
HIS AGENT

MEASUREMENT OF TEMPERATURE OF A MOVING STRAND IN A VACUUM

This application is a continuation-in-part of U.S. Pat. application, Ser. No. 585,140, filed Oct. 7, 1966 now abandoned.

This invention relates generally to method and apparatus for measuring the temperature of a moving strand in a vacuum and relates more particularly to improvements in such method and apparatus whereby a more accurate indication of temperature is obtained when a thermocouple is used as the temperature sensing device.

It is known to measure the temperature of a moving strand under ordinary atmospheric conditions by maintaining a thermocouple in sliding contact with the strand. I have found, however, that in a vacuum such a technique fails to indicate accurately the temperature of the strand.

I have as an object of my invention to provide method and apparatus for accurately measuring the temperature of a moving strand within a vacuum, using a contact thermocouple. Another object of my invention is to provide method and apparatus for enabling adequate thermal contact to be made between a thermocouple and a moving metal strand in a vacuum. Yet another object of my invention is to provide for such thermal contact so as to enable an accurate measurement of the strand temperature to be made. Still a further object of my invention is to provide method and apparatus for establishing a localized area of relatively high thermal conductivity around a thermocouple in a vacuum whereby an accurate measurement of the temperature of a continuously moving strand in sliding contact with the thermocouple is made. Other objects of my invention will appear from the description thereof which follows:

I have found that a thermocouple placed in sliding contact with a moving strand within a vacuum does not accurately indicate the temperature of the strand, although it will do so under atmospheric conditions. Thus, the atmosphere surrounding the thermocouple contact area plays a crucial part in the heat transfer process between the moving strand and the thermocouple. To improve thermal contact between the thermocouple and the moving strand in a vacuum and thus enable more accurate temperature measurements to be made, I supply a gas which is inert to the strand to the portion of the thermocouple which is in sliding contact with the strand so as to provide a localized area of relatively high thermal conductivity around the thermocouple. The gas flow rate is sufficient to improve the thermal contact between the thermocouple and the strand, but is not so great as to appreciably cool the thermocouple or to materially degrade the over-all vacuum level within the vacuum chamber. In one embodiment of my invention the requisite amount of inert gas is injected with no additional provision being made. In another embodiment of my invention, where in order to insure adequate thermal contact the gas flow rate would necessarily be so high as to materially degrade the vacuum or cool the thermocouple, a gas confining means is provided about the thermocouple in the region where the thermocouple contacts the substrate. The gas confining means acts to confine the gas to the immediate area of thermocouple-substrate contact and thus permits a lower gas flow rate to be used for maintaining adequate thermal contact than would otherwise be necessary, thereby insuring that the thermocouple will not be cooled and the vacuum will be maintained.

The above brief description will be more readily understood from the following detailed description in reference to the accompanying drawing which illustrates embodiments of my invention presently preferred by me.

While my invention is broadly applicable to measuring the temperature of any type of moving strand within a vacuum, it is specifically adapted to measuring the temperature of steel strip passing through a vacuum chamber for treatment therein such as vapor coating of the strip with aluminum or zinc. It is highly desirable in such coating procedures to know the temperature of the strip.

Figure 1:
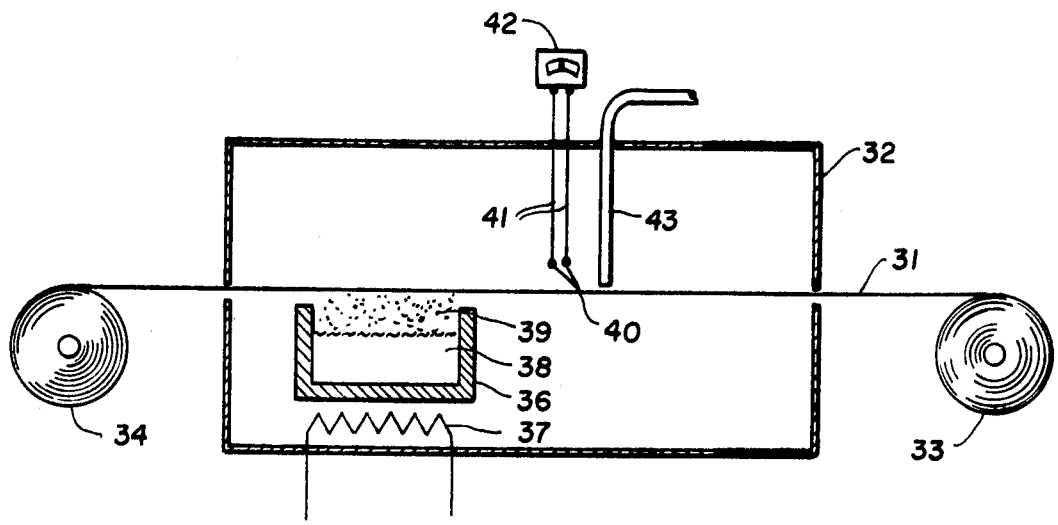
FIG. 1 is a schematic representation of one embodiment of my invention.

In FIG. 1, the substrate 31, in the form of a steel strip, is passed horizontally through a vacuum chamber 32 from an uncoiling reel 33 to a coiling reel 34. Reel 34 is suitably driven so as to continuously move the strip through the chamber at any desired speed. Within chamber 32 below the path of travel of the strip is a crucible 36 provided with an electric resistance heater 37. In crucible 36 is maintained a pool of liquid coating material 38 which gives off vapor 39 at its surface. The vapor impinges on the undersurface of strip 31 as it moves through the vacuum chamber and condenses thereon, thereby coating the strip. Positioned upstream of the crucible is thermocouple 40 which is placed in sliding contact with the strip. The leads 41 of the thermocouple are connected to a conventional meter 42 which indicates the temperature of the strip. Extending into the vacuum chamber to the immediate area of the thermocouple-strip contact is a tubular snorkel 43 which is connected to a helium source outside the vacuum, not shown. As the steel strip passes through the vacuum chamber, helium gas is supplied through member 43 to the region of the thermocouple-strip contact and the gas establishes a localized area of relatively high thermal conductivity at the region of contact. It is necessary to deliver a continuous supply of gas to the contact region since the gas will be continually removed by the chamber vacuum pumps. The gas flow rate is sufficient to provide for adequate thermal contact between the thermocouple and strip but is not so great as to cool the thermocouple or materially degrade the vacuum.

Figure 2:
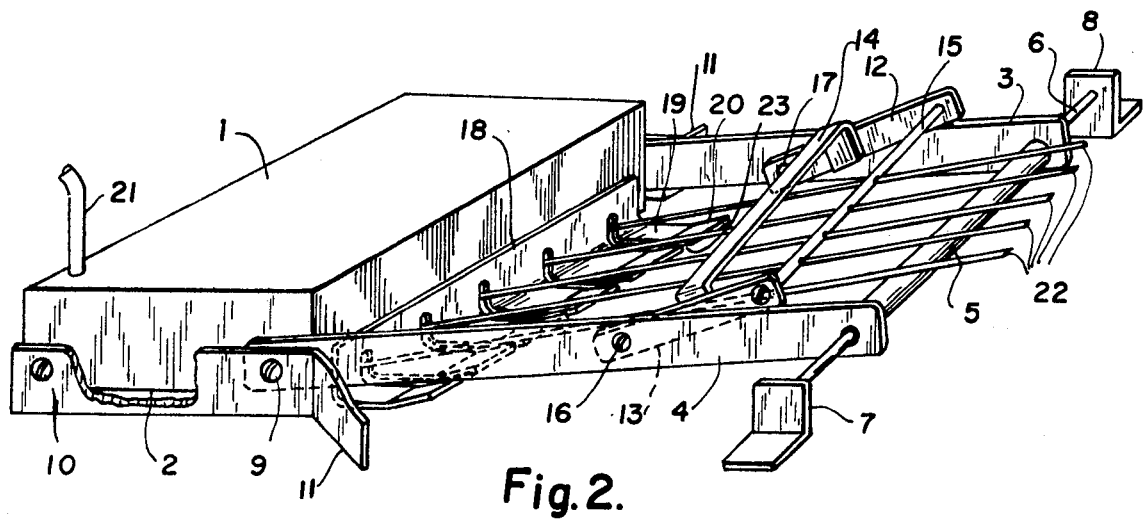
FIG. 2 is a perspective view of another embodiment of my invention.

A second embodiment of my invention is illustrated in the device of FIG. 2. This device includes means for confining the injected gas in a manner so that a low gas flow rate can be used, thus reducing the likelihood of cooling the thermocouple or degrading the vacuum. In operation, the device is adapted to be positioned on a steel strip pass line within a vacuum chamber with the strip passing beneath the device from right to left as it is illustrated in FIG. 2. Thus, for example, the device of FIG. 2 is used in conjunction with the apparatus of FIG. 1 in place of the thermocouple 40 and snorkel 43.

The device of FIG. 2 includes a support frame having side members 3 and 4 fixedly joined at one end by tubular member 5. The frame is pivotally mounted about rod 6 which extends through tubular member 5. Rod 6 is secured to mounting brackets 7 and 8 and the brackets in turn are secured to a stationary support off the pass line, not shown. The other end of the support frame is pivotally mounted to the cover or gas confining means 1 at 9 by side member 4 and at a location opposite 9 where side member 3 is attached.

Secured to the cover on either side thereof is a guide 10 having an outwardly flared portion 11. The guides extend below the bottom edge 2 of the cover so that as the steel strip passes beneath the cover in contact with the bottom edge thereof, the guide prevents the strip from wandering laterally from the confines of the cover. The outwardly flared portions 11 of the guides insure proper entry of the leading end of the steel strip under the cover.

Mounted on the support frame is a thermocouple carrying frame comprising side members 12 and 13, brace 14 and fastening rod 15. The brace 14 serves to join the two side members 12 and 13 together and provide rigidity to the frame. The thermocouple carrying frame is secured to the support frame by means of adjustable fasteners 16 and 17 and may be angularly adjusted with relation to the support frame by loosening the fasteners, rotating the thermocouple frame with relation to the support frame and resecuring the fasteners. The thermocouples 22, of which there are five (5) in number, are secured to the thermocouple frame along rod 15 and extend into the cover 1 through holes in the front side thereof. The individual thermocouples are each connected to suitable means, not shown, for indicating the temperature of that portion of the strip which they contact. The series of thermocouples enables the temperature profile of the strip to be determined. It is desired that a finite length of each of the thermocouples be placed in contact with the strip which length is approximately equivalent to several times the diameter of the thermocouples. This provision prevents the establishment of temperature gradients along the length of the thermocouples near their tips which would otherwise occur if only the tips of the thermocouples contacted the strip and which would lead to errors in temperature measurements due to heat losses from the tips by conduction. The manner in which this is accomplished in the embodiment of FIG. 2 is to have portions of the thermocouples so arranged that when the device is in use, said portions are maintained in sliding contact with the strip. Specifically, the thermocouples extend under the cover a sufficient degree so as to protrude beyond the bottom edge 2 of the cover in the absence of any restraining means. Then when the apparatus is positioned on the strip in its normal operating position and the bottom edge of the cover lies flush with the strip, the thermocouples, which are quite flexible, are bent upwardly and consequently a finite length of each of the thermocouples is caused to lie in contact with the strip as can be readily understood. In addition, greater or lesser lengths of the thermocouples can be caused to lie in contact with the strip by rotating the thermocouple carrying frame as will now be described. Under the circumstances described above an upward force is exerted by the strip against the thermocouples and by the rod 15 against the thermocouples at those points where the thermocouples are fastened to the rod and a downward force is exerted by the front side of the cover against the thermocouples where the latter extend therethrough. If it is desired to place a greater length of each of the thermocouples in contact with the strip, the thermocouple carrying frame is rotated upwardly as the frame is illustrated in FIG. 2. By so rotating the thermocouple frame the thermocouples are caused to bend against the front side cover at the point where they enter and this results in the thermocouples assuming the general configuration of a curved line because of their flexibility thereby causing a greater length of thermocouple to lie in contact with the strip as can be readily understood. Alternatively if it is desired to place a lesser length of thermocouple in contact with the strip, the thermocouple frame is rotated downwardly relieving the bending stress on the thermocouples which occurs at the point at which they enter the front side of the cover, causing the thermocouples to assume more of a straight line configuration resulting in a lesser length of thermocouple being in contact with the strip. The thermocouple frame thus acts as a means for maintaining portions of the thermocouples in sliding contact with the strip.

The front side of the cover has mounted thereon an entry guide which has a back portion 18 by which the guide is secured to the cover, a rear portion 19 extending outwardly from the cover substantially parallel to the bottom edge of the cover and a forward portion 20 which extends upwardly to the cover from the rear portion of the entry guide. The configuration of the entry guide insures proper entry of the leading edge of the steel strip beneath the cover 1, especially in those instances where the leading edge of the steel strip possesses an upward curvature, and also insures proper entry of any welds or buckles which exist in the strip. The rear and forward portions 19, 20 of the entry guide are slotted immediately below the thermocouples 22 at 23 so that as the thermocouple frame is adjusted, as discussed above, or as the cover pivots about the support frame and consequently about the thermocouple carrying frame, the thermocouples will pass into the slots and not strike the entry guide.

Extending through the top of the cover is tubular member 21 which provides a means for supplying inert gas to the cover or gas confining means 1. The tubular member extends to a suitable inert gas source, not shown.

Briefly, the operation of the device is as follows: The device is first positioned on a steel strip pass line within a vacuum chamber by securing the brackets 7 and 8 to a stationary support off the pass line. The steel strip moves from right to left and passes under the curve 1 with the aid of entry guide 18 and flared portions 11 of guide 10, and as it moves it remains substantially flush with the entire bottom edge of the box through any rise or fall of the steel strip due to raising or lowering of the pass line or for any other reason. This is accomplished through the pivotal connections provided between the cover 1 and the support frame and between the support frame and the mounting rod 6 as can be readily understood. Guide 10 acts as a constraint to cause the cover to follow any lateral motion of the strip which may occur. The cover can move laterally because tubular member 5 is free to slide axially along rod 6. As the strip passes under the cover, an inert gas such as helium is supplied through the tubular member 21 to the cover. The cover acts to confine the injected gas generally to that portion of the strip which is passing beneath the cover. The gas will not readily escape from under the cover since the latter remains flush with the steel strip as earlier discussed. The presence of the inert gas creates an area of increased pressure and establishes an area of improved thermal conductivity, thereby enabling an accurate indication of the temperature of the strip to be made by the thermocouples.

It will be understood that various changes in the details, materials, steps and arrangements of parts, which have been herein described and illustrated in order to explain the nature of the invention may be made by those skilled in the art within the principle and scope of the invention as expressed in the appended claims.

I claim:

1. A process for measuring the temperature of a moving strand in a vacuum comprising the steps of sensing said temperature by contacting the strand with a thermocouple means in sliding relationship thereto while supplying a gas inert to the strand to that portion of the thermocouple means in contact with the strand, and measuring the temperature so sensed.

2. The process of claim 1 including supplying the gas at a rate sufficiently low enough not to cool the portion of the thermocouple means in contact with said strand and materially degrade the vacuum, but high enough to provide good thermal contact between the thermocouple and the strand.

3. The process of claim 2 wherein the strand comprises steel.

4. The process of claim 1 including confining the gas substantially to that portion of the thermocouple means in contact with said strand.

5. The process of claim 4 including supplying the gas at a rate sufficiently low enough not to cool the portion of the thermocouple means in contact with said strand and materially degrade the vacuum, but high enough to provide good thermal contact between the thermocouple and the strand.

6. The process of claim 5 wherein the strand comprises steel.

* * * * *